Figure 1:
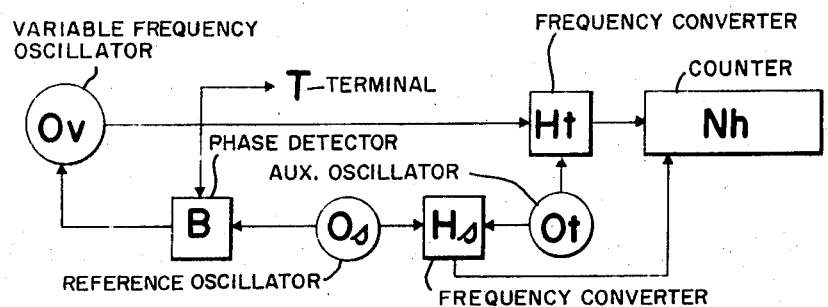

United States Patent [19]
Ashida

[11] 3,829,769
[45] Aug. 13, 1974

[54] FREQUENCY MEASURING APPARATUS
[75] Inventor: Hitoshi Ashida, Gyoda, Japan
[73] Assignee: Takeda Riken Industry Company Limited, Tokyo, Japan
[22] Filed: Jan. 22, 1973
[21] Appl. No.: 325,582

[30] Foreign Application Priority Data
Jan. 22, 1972  Japan.................................. 47-8073

[52] U.S. Cl............................................. 324/79 D
[51] Int. Cl............................................. G01r 23/14
[58] Field of Search........................ 324/79 D, 79 R

[56] References Cited
UNITED STATES PATENTS
2,539,673  1/1951  Peterson........................... 324/79 D
3,087,121  4/1963  Bell................................... 324/79 D
3,283,257  11/1966  Boyce.............................. 324/79 D Primary Examiner—Alfred E. Smith
Attorney, Agent, or Firm—William J. Daniel

[57] ABSTRACT

This invention relates to a frequency measuring apparatus whereby a local oscillation frequency is determined by positively observing the higher harmonic number; superhigh frequencies ranging from several to several scores of gigahertzes can be precisely measured by using this higher harmonic number measuring apparatus.

4 Claims, 3 Drawing Figures

FREQUENCY MEASURING APPARATUS

This invention relates to frequency measuring apparatus.

When it is desired to precisely measure a very high frequency with a counter, a signal to be measured is counted by converting it to a low frequency by mixing a local oscillation output of a known frequency with it. In order to obtain such local oscillation output of a known frequency, for example, a variable frequency oscillator of a voltage controlled type is synchronized with the higher harmonics of the output of a reference oscillator. However, a complicated apparatus has been required to determine such higher harmonic number and it has been difficult to positively determine the harmonic number.

Therefore, an object of the present invention is to provide a frequency measuring apparatus using a local oscillation frequency as described above, wherein the high harmonic number is positively observed with a simple device.

Another object of the present invention is to provide a simple apparatus for precisely measuring superhigh frequencies ranging from several to several scores of gigahertzs by using this higher harmonic number measuring apparatus. Particularly, a frequency measuring apparatus can be easily formed by adding a slight device to a spectrum analyzer.

Figure 2:
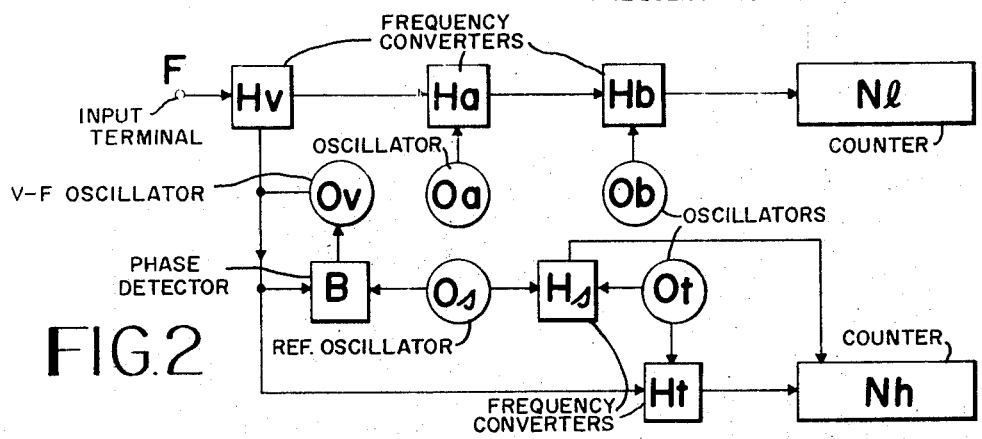
Figure 3:
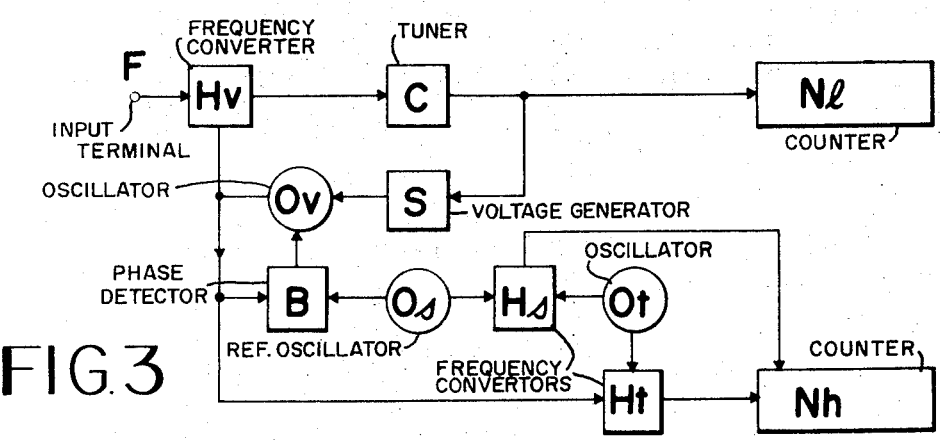

In the drawings:

FIGS. 1 to 3 are block diagrams showing various embodiments of the frequency measuring apparatus according to the present invention.

FIG. 1 is a first embodiment of the present invention wherein the output of a voltage controlled type variable frequency oscillator $O_V$ and the output of a reference oscillator $O_S$, such as a crystal oscillator, are applied to a phase difference detector B so that any higher harmonics of the output of the reference oscillator and the output of the variable frequency oscillator may be mixed together or each may sample the other. That is to say, when the output frequency of the variable frequency oscillator $O_V$ coincides with the higher harmonics of the output of the reference oscillator $O_S$, a direct current output will be sent out of the detector B. Therefore, by controlling the oscillator $O_V$ with this direct current output, a phase synchronization is made between said oscillator $O_V$ and the dth number higher harmonics of the reference oscillator $O_S$. The apparatus in FIG. 1 is intended to measure the output frequency dfs of the oscillator $O_V$ by determining the above mentioned higher harmonic number d in such case. The output is sent out of the output terminal T.

An auxiliary oscillator Ot having a slight or small frequency difference $\Delta f$ between it and the reference oscillator $O_S$ is provided, its output and the output of the variable frequency oscillator $O_V$ are applied to a frequency converter Ht, the outputs of the reference oscillator $O_S$ and auxiliary oscillator Ot are applied to a frequency converter Hs and the output signal of the converter Ht is applied to a counter Nh gated with the output of the converter Hs. That is to say, if the output frequency of the reference oscillator $O_S$ and is fs, and the output frequency of the auxiliary oscillator Ot is $(fs + \Delta f)$, an output of a frequency given by $d\Delta f$ will be sent out of the converter Ht by the mixing or sampling of the dth number higher harmonics of the output of this auxiliary oscillator and the output of the variable frequency oscillator $O_V$. Further, the frequency converter Hs delivers an output of the frequency $\Delta f$ i.e., the difference between the output frequency fs of the reference oscillator Os and the output frequency $(fs + \Delta f)$ of the auxiliary oscillator Ot. Therefore, the counter Nh counts the number of the output frequency of the converter Ht for one period $1/\Delta f$ of this output or a time $10^n$ times (n is a positive or negative integer) as long as the period $1/\Delta f$. Therefore, if the above mentioned counting time is, for example, $1/\Delta f$, a counted value d will be obtained. The output frequency dfs of the variable oscillator $O_V$ can be determined from this value d and the known output frequency fs of the reference oscillator. Incidentally, it is evident that, in this case, if the maximum value of the anticipated higher harmonic number d is D, the chance of a misobservation can be eliminated by selecting the above mentioned slight frequency difference $\Delta f$ to be smaller than $fs/2D$.

The apparatus of the embodiment in FIG. 2 is intended to count with a simple counter the frequency $fx$ of the unknown signal to be measured applied to the terminal F. The same parts as in FIG. 1 are given corresponding designations in FIG. 2. As described above, the variable frequency oscillator $O_V$ delivers the output of the frequency $dfs$. This output and the signal to be measured of the input terminal F are applied to the frequency converter Hv. Therefore, the converter Hv sends out an output of a frequency $(fx - dfs)$. This output and the known output of the oscillator Oa are applied to the frequency converter Ha. Therefore, if the output frequency of the oscillator Oa is fa, the converter Ha will send out an output of a frequency $(fx - dfs - fa)$. Further, as this output and the output of an oscillator Ob of a frequency fb are applied to a frequency converter Hb, this converter applies an output of a frequency $(fx - dfs - fa - fb)$ to the counter $Nl$. The purpose of converters Ha and Hb with their associated oscillators is to bring the output frequency of converters Hv within the operating range of counter $Nl$. The counter $Nl$ counts the frequency of this output for $10^n$ seconds (n is 0 or a positive or negative integer) and indicates its counted value. That is to say, if the counting time of the counter $Nl$ is 1 second, its counted value will be $(fx - dfs - fa - fb)$. Further, as the counter Nh indicates the higher harmonic number d, the frequency $fx$ of the signal to be measured can be determined by the sum of the value $(dfs + fa + fb)$, obtained by multiplying the value of said number d by the output frequency fs of the reference oscillator Os, and further adding the output frequencies fa and fb respectively of the oscillators Oa and Ob and the counted value of the counter $Nl$. Incidentally, if the output frequency of the reference oscillator Os is made, for example, 1 MHz, each of the units of the frequencies fa and fb is selected to be of 1 MHz ore more and these values are present at a unit of 1 MHz in the counter Nh, the figures above 1 MHz will be indicated by counter Nh and the figures below MHz will be indicated by the counter $Nl$. Therefore, the frequency of the signal to be measured can be directly read by arranging the indicating parts of the counters Nh and $Nl$ in series. Further, in the frequency converter Hv, it is possible to utilize the mth number higher harmonics of the output of the oscillator $O_V$. In such case, the same measurement can be made by multiplying the counted value d of the counter Nh by m.

FIG. 3 is of an alternative embodiment for measuring the frequency of the unknown signal applied at the terminal F in which the output of a sweeping voltage generator S is applied to the voltage controlled type variable frequency oscillator $O_V$ in FIG. 1. That is to say, a sweeping oscillator is formed of the oscillator $O_V$ and voltage generator S. Where a measurement is made and the voltage generator S is started, the output frequency of the oscillator $O_V$ will gradually increase or decrease. Accordingly, the output frequency of the frequency converter Hv will also vary and its output will be applied to a tuner C. Therefore, when the output frequency of the converter Hv coincides with the tuning frequency of the tuner C, an output will be sent out by the tuner and the output voltage variation of the sweeping voltage generator S will be stopped by that output signal. In this state, a phase synchronization is made between the variable oscillator $O_V$ and the dth number higher harmonics of the output of the reference oscillator by the phase difference detector B and reference oscillator $O_S$ in the same manner as in the apparatus in FIG. 2. Therefore, the frequency of the measured signal to be applied to the terminal F is determined by measuring the output frequency of the tuner C with the counter Nl and determining the higher harmonic number d with the counter Nh in the same way as in FIGS. 1 and 2.

As explained with reference to the above embodiments, in the present invention, higher harmonic numbers can be positively measured with a simple apparatus. Further, by measuring superhigh frequencies by using this apparatus, there is an excellent effect that frequencies can be precisely measured without requiring any costly counter high in the operating velocity and by only adding a slight device to the spectrum analyzer provided with a sweeping oscillator or the like.

What is claimed is:
1. A frequency measuring apparatus comprising:
   a reference oscillator providing a reference frequency output,
   a variable frequency oscillator providing a variable frequency output,
   means for synchronizing said variable frequency output with the dth harmonic of said reference output, an auxiliary oscillator providing an auxiliary frequency output differing slightly from the reference frequency output,
   a frequency converter for receiving said auxiliary frequency output and said dth harmonic variable frequency output and giving an output equal to the dth harmonic of the frequency difference between said reference frequency and said auxiliary frequency, and
   a counter for receiving said converter output and counting the frequency thereof divided by the slight difference in said reference and auxiliary frequencies whereby said counter indicates the harmonic number d at which said variable frequency is synchronized.

2. The apparatus of claim 1 including a second frequency converter for receiving the auxiliary frequency output and said reference frequency output and giving an output equal to the slight frequency difference therebetween and wherein said two converter outputs are gated by said counter whereby said counter counts said first converter frequency output for a period proportional to the reciprocal of said frequency difference.

3. A frequency measuring apparatus comprising:
   a reference oscillator providing a reference frequency output,
   a variable frequency oscillator providing a variable frequency output,
   means for synchronizing said variable frequency output with the dth harmonic of said reference output, an auxiliary oscillator providing an auxiliary frequency output differing slightly from the reference frequency output,
   a frequency converter for receiving said auxiliary frequency output and said dth harmonic variable frequency output and giving an output equal to the dth harmonic of the frequency difference between said reference frequency and said auxiliary frequency,
   a counter for receiving said converter output and counting the frequency thereof divided by the slight difference between said reference and auxiliary frequencies whereby said counter indicates the harmonic number d at which said variable frequency is synchronized,
   a source of an unknown frequency signal to be determined, a further frequency converter for receiving the unknown frequency signal and the harmonic frequency output of said variable frequency and giving an output equal to the difference therebetween, and a further counter for counting said difference, whereby from the reference frequency and harmonic number indicated at said first counter, said unknown frequency can be calculated.

4. The apparatus of claim 1 wherein said variable oscillator is a sweeping oscillator and including a tuner receiving the output from said first frequency converter, said tuner being operative to terminate the sweep of said oscillator when output received thereby becomes substantially equal to a predetermined frequency.

* * * * *

UNITED STATES PATENT OFFICE
CERTIFICATE OF CORRECTION

PATENT NO. : 3,829,769
DATED     : August 13, 1974
INVENTOR(S) : Hitoshi ASHIDA

It is certified that error appears in the above-identified patent and that said Letters Patent are hereby corrected as shown below:

Column 4, Claim 4, line 47, change "1" to --- 3 ---.

line 49, change "first" to --- further ---.

Signed and Sealed this second Day of December 1975

[SEAL]

Attest:

RUTH C. MASON
Attesting Officer

C. MARSHALL DANN
Commissioner of Patents and Trademarks